3,061,561
POLYVINYL ESTER DISPERSIONS AND
METHOD FOR MAKING THEM
Karl-Heinz Kahrs and Alfred Kühlkamp, Frankfurt am Main, Germany, assignors to Farbwerke Hoechst Aktiengesellschaft vormals Meister Lucius & Brüning, Frankfurt am Main, Germany, a corporation of Germany
Filed Sept. 13, 1960, Ser. No. 55,650
Claims priority, application Germany Dec. 8, 1956
9 Claims. (Cl. 260—17)

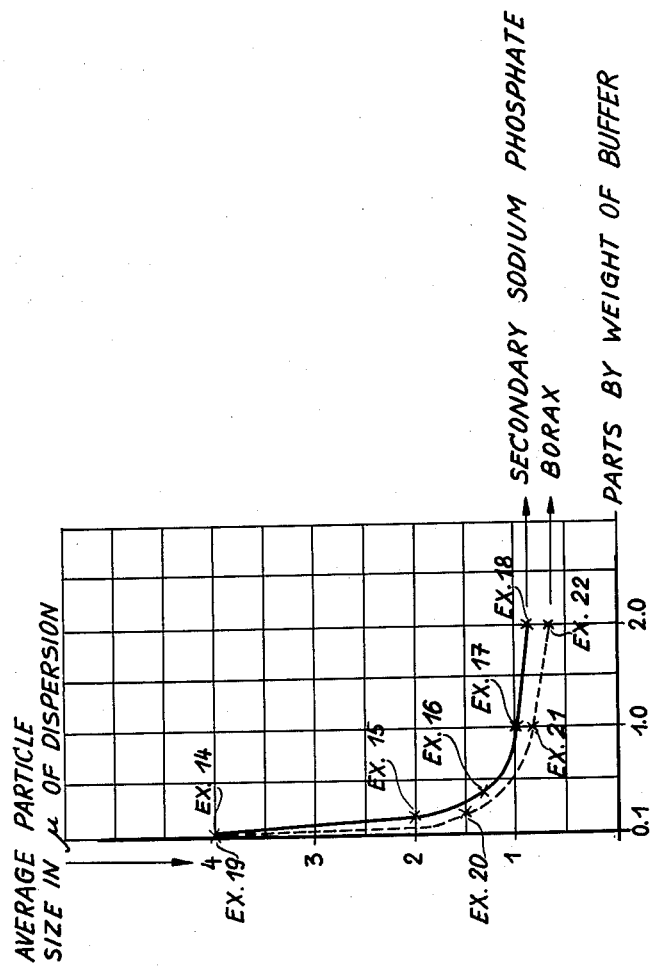

The present application is a continuation-in-part application of our application Serial No. 700,504, filed December 3, 1957, now abandoned.

This invention relates to stable aqueous dispersions of polyvinyl esters and vinyl ester copolymers, wherein the dispersed particles have a substantially uniform size adjustable within definite limits and to processes for making said dispersions.

The dispersions produced by these processes are suitable as binders for emulsion paints and as adhesives. The polymer dispersions yield water-proof films and coatings and retain their stability, their rheological properties, and the water-proofness of their films even after the addition of pigments and other fillers, so that said dispersions are especially suitable in the aforesaid fields of application.

On account of their numerous advantageous properties, especially simple and safe handling and relatively low costs, aqueous dispersions of polymers have largely displaced those water-insoluble artificial resins used in paints and adhesives in the form of solutions in organic solvents. Quite a number of processes are known for the manufacture of such aqueous dispersions by polymerizing unsaturated compounds in an aqueous medium. U.S. Patent 2,227,163 describes the manufacture of stable dispersions of polymerization products with the use of polyvinyl alcohols as a protective colloid. Another method for polymerizing in aqueous phase has been described in German Patent 744,318, according to which polymerization is carried out in an aqueous solution of vinyl sulfonic acid or salts of vinyl sulfonic acid with the use of a soap-like emulsifier. In this case, too, stable dispersions are obtained. By the process disclosed in U.S. Patent 2,227,163, a coarsely dispersed latex having relatively large particles, the diameter of which ranges from 2 to 10μ is obtained, while the latex particles obtained by the process of German Patent 744,318 have a diameter of only 0.2 to 1μ.

Furthermore, it is known to use instead of polyvinyl alcohol other protective colloids of animal or vegetable origin. Australian Patent 145,508 or Canadian Patent 467,921 teach the use of gum arabic, oxethyl cellulose, water-soluble starch, methyl cellulose, carboxymethyl cellulose, or gelatin.

The size of the latex particles of the dispersions is of great importance for the use of the dispersions in certain applications. The size of the latex particles influences the wet abrasion resistance and the transparency of films made of such dispersions, the pigment binding capacity, the freeze-thaw stability, the electrolyte stability and other properties of the latex, for example.

In the manufacture of polymer dispersions it is often customary to use a protective colloid, such as polyvinyl alcohol or water-soluble polymers of animal or vegetable origin, in combination with an emulsifier. The emulsifier increases the stabilizing action of the protective colloid in the course of the polymerization and, particularly, determines a definite particle size. Thus, Harkins (cf. F. A. Bovey, I. M. Kolthoff, A. I. Medalia and I. E. J. Meehan, "Emulsion Polymerization," 1955, Interscience Publishers, Inc., New York, page 166 et seq.) has found that the number of the particles is equal to the number of the formed emulsifier miscellae the number of the miscellae—and consequently the particle size—is finally defined by the emulsifier concentration in the aqueous phase, because with a given polymer concentration in the dispersion the particle size is a function of the particle number.

It is therefore possible to produce smaller latex particles by increasing the emulsifier concentration. However, this process possesses several disadvantages. For example, undesirable amounts of the emulsifier are introduced into the dispersion, whereby the latex formation of films of the polymer is impaired, or the tendency of the dispersion to foam is increased. Especially the latter is very troublesome in an emulsion polymerization process and renders impossible carrying out of such a process on a plant scale. On account of the aforesaid disadvantages a dispersion that possesses many advantages, but the latex particle size of which is still too high, cannot be improved by using a larger amount of emulsifier in the polymerization in order to reduce the latex particle size.

The industry thus has a great need for processes for modifying particle size distribution without impairing the quality of the dispersions.

The present invention relates to a process for the manufacture of dispersions of polyvinyl esters or vinyl ester copolymers by polymerizing the monomers in aqueous emulsion, whereby the particle size can be adjusted within a range of 0.5 to 15μ without the introduction of large and inconvenient amounts of emulsifier, 0.5 and 15μ are only the lower and upper limit within which the aforesaid particle sizes can be adjusted (cf. the examples), the particles produced by a given polymerization having a substantially uniform size. It has been found that stable aqueous dispersions of the aforesaid polymers, the particle size of which can be adjusted as mentioned above, can, surprisingly, be prepared with the use of water-soluble cellulose derivatives as protective colloid when the aqueous phase in which the polymerization is carried out after the addition of the activator contains a definite combination of the water-soluble cellulose derivative, with hydrolyzable alkali metal salts of monohydroxy-diphenyls, buffer salts, and/or semi-esters of dicarboxylic acids. As the water-soluble cellulose derivative, an hydroxy cellulose, especially water-soluble hydroxy ethyl cellulose, is particularly suitable. The monohydroxy-diphenyls, preferably 2-hydroxy-diphenyl, are conveniently employed in the form of their potassium or sodium salt. Buffer salts of phosphoric, boric, acetic, citric, and adipic acid are employed to particular advantage, and suitable semi-esters are those of acids such as maleic, fumaric, and itaconic acids.

As far as the additives are soluble in the monomer they can first be dissolved in the monomer and then introduced into the aqueous phase together with the monomer. In the case of those substances, which are soluble in water as well as in organic media, it is likewise possible to add part of said substances to the aqueous phase and to dissolve the other part in the monomer.

The process of the present invention is substantially different from known methods. In the following it is illustrated in detail, whereby the advantages over the usual processes become evident.

In the process of the invention an emulsifier, namely one or more hydroxy-diphenyl salts, is used in combination with a water-soluble cellulose derivative, but in contra-distinction to the emulsifiers used in prior art processes the emulsifier is only effective as such for a definite period of time for the following reasons. Alkali metal salts of monohydroxy-diphenyls hydrolyze in aqueous solution with the following hydrolysis equilibrium:

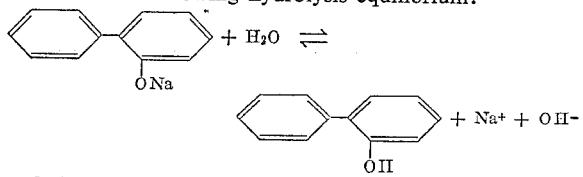

Only the alkali metal salt is effective as emulsifier, and not the 2-hydroxy-diphenyl itself. The hydrolysis equilibrium can be modified in desired manner by the presence of bases or acids that is to say the concentration and period of effectiveness of the emulsifier can be modified—whereby the number of the particles and ultimately the size of the latex particles are varied.

If the aqueous phase is admixed with substances that shift the equilibrium shown above to the left side and increase the emulsifier concentration, the size of the latex particles is reduced. Additives of this kind are bases, preferably basic buffer salts. Acid components, for example semi-esters of unsaturated dicarboxylic acids, have an opposite effect. They shift the above equilibrium to the right side and produce an enlargement of the particles. This effect can be controlled by the simultaneous presence, with the esters, of buffer salts. In case an extremely high stability of the dispersions is required, it is recommended to choose a combination of one or several semi-esters of unsaturated dicarboxylic acids together with basic buffer salts, since in this case especially advantageous dispersions can be obtained. The semi-esters of unsaturated dicarboxylic acids copolymerize with the vinyl ester in the course of the reaction to form copolymers which are partially soluble in water, and thus increase the stability. Consequently, by adding a small amount of additives to the aqueous phase, that is to say without substantially modifying the composition of the dispersion, the latex particles size can be modified within the aforesaid range as desired.

The controllable adjustment of the particles size is highly advantageous, since it is thus possible to adapt the particle size to the desired application.

A further advantage of the process of the invention resides in that the emulsifier used, for example the sodium salt of hydroxy-diphenyl, is destroyed at the end of the polymerization. That is the sodium salt which is effective as an emulsifier is gradually transformed in the course of the polymerization into free hydroxy-diphenyl which is ineffective as emulsifier. When, for example, potassium perhydroxy disulfate is used as an activator, potassium bisulfate is formed in the course of the polymerization and reacts with the sodium salt of the hydroxydiphenyl according to the following equation:

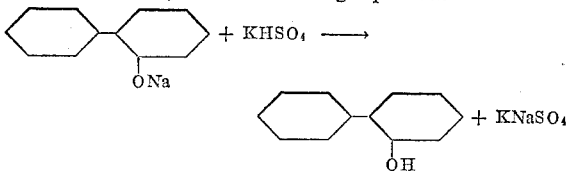

The free monohydroxy-diphenyl formed in this reaction is absorbed by the polymer. Thus, possible disturbance of film formation by the emulsifier itself being absorbed on the surface of the polymer is eliminated, and polymerization batches of this kind have no tendency to foam.

The following examples serve to illustrate the invention but they are not intended to limit it thereto. The parts are by weight unless otherwise stated and the percent figures, for example of the solid contents, are likewise by weight. The examples clearly show that even small additions considerably modify the particle size, and that by small modifications dispersions having optimum properties can be obtained.

*Example 1*

A 2 liter four-necked flask provided with a reflux condenser, thermometer, dropping funnel, and loop stirrer having a speed of 100 rotations per minute was charged with 70 parts of distilled water heated to about 70° C. In the water there were then successively dissolved 2.4 parts hydroxyethyl cellulose (viscosity of a 5% solution at 20° C.=250 centipoises, oxethyl content=28%) and 0.2 part sodium salt of 2-hydroxydiphenyl. When the whole was dissolved, the aqueous phase was heated to 80° C. When an internal temperature of 80° C. was reached, 0.33 part potassium persulfate dissolved in 6 parts of distilled water were added and immediately thereafter 5 parts of vinyl acetate. The internal temperature first decreased to 72–74° C. and then again reached 80° C. within 5–10 minutes.

When the internal temperature of 80° C. was reached, a further 95 parts of vinyl acetate were added continuously in the course of 240–260 minutes.

The polymerization temperature amounted to 78–80° C. After the addition of the total amount of vinyl acetate the internal temperature reached a peak of 86–90° C. After having reached said temperature peak the reaction mixture was cooled. A conversion of more than 99% was attained. The dispersion obtained had the following properties:

Solid content _____ percent__ 56±1
Content of residual monomer _____ do____ <1
Latex viscosity (according to Hoeppler)__poises__ 28–30
K value (according to Fikentscher[1]) _____ 66–68

[1] H. Fikentscher, Cellulosechemie 13, 58 (1952).

When operating with the aforesaid ratio of hydroxyethyl cellulose to sodium phenyl-phenolate a medium particle size of 4–5µ is obtained.

This particle size can be varied in definite manner by the addition of buffer salts dissolved in the aqueous phase, or of semi-esters of unsaturated acids, which can either be dissolved in the monomer or added to the aqueous phase, or by a combination of these two steps. The following table serves to illustrate these results. For a better review the table includes the preceding Example 1. The polymerization is carried out as described in Example 1; in all the examples the content of residual monomer is less than 1%.

| Example No. | 1 | 2 | 3 | 4 | 5 | 6 | 7 | 8 | 9 | 10 |
|---|---|---|---|---|---|---|---|---|---|---|
| Vinyl acetate, parts | ←————————————————100————————————————→ | | | | | | | | | |
| Hydroxyethylcellulose, parts | ←————————————————2.4————————————————→ | | | | | | | | | |
| Na-phenylphenolate, part | ←————————————————0.2————————————————→ | | | | | | | | | |
| Potassium persulfate, part | ←————————————————0.33———————————————→ | | | | | | | | | |
| Water, parts | ←————————————————76—————————————————→ | | | | | | | | | |
| Monoisooctylmaleinate | | 0.6 | 0.6 | 0.6 | 0.6 | | | | | |
| NaH$_2$PO$_4$.2H$_2$O | | | 0.6 | | | 0.15 | | | | |
| Na$_2$HPO$_4$.12H$_2$O | | | 1.4 | | | 0.35 | | | | |
| Borax | | | | 0.1 | 2.0 | | 0.1 | 2.0 | | |
| (NH$_4$)$_2$HPO$_4$ | | | | | | | | | 0.1 | 2.0 |
| Solid content, percent | 56–58 | 56–58 | 56–58 | 56–58 | 56–58 | 56–58 | 56–58 | 56–58 | 56–58 | 50–58 |
| Latex viscosity according to Hoeppler, poises | 28–30 | 15–25 | 40–45 | 43–45 | 750–760 | 40–42 | 610–620 | 78–80 | 60–63 | 165–170 |
| K value according to Fikentscher[1] | 66–68 | 78–80 | 42–44 | 60–62 | 33–35 | 55–57 | 50–52 | 33–35 | 60–63 | 45–48 |
| Average particle size, µ | 4–5 | 8–9 | 2–3 | 5–6 | 0.6–0.8 | 3–4 | 1–2 | 0.6–0.8 | 4–5 | <0.6 |

[1] Literature: H. Fikentscher, Cellulosechemie 13, 58 (1932).

The table shows that the addition of semi-esters increases the particle size: Compare Example 1→2, particle size 4–5μ→8–9μ.

The addition of buffer salt to such a mixture reduces the size of the latex particles: Compare Example 2→3, particle size 8–9μ→2–3μ.

When the amount of buffer salt added is smaller than that of Example 3, the particles are not so strongly reduced in size as in Example 3: Compare Example 2→4, particle size 8–9μ→5–6μ.

When the amount of buffer salt added is greater than that of Example 3, as shown in Example 5, the particles have a size of less than 1μ: Compare Example 2→5, particle size 8–9μ→0.6–0.7μ.

If the polymerization is carried out without the addition of semi-ester, a similar decrease in size with higher concentration or strength of buffer is obtained as shown in Examples 6–10 in comparison with Example 1.

It is evident that, as in Examples 2–5, the particle size is influenced by the amount of buffer and also by the nature of the buffer added. An increasing amount of buffer leads to a reduction in the size of the latex particles: Compare Example 1→7→8, particle size

4–5μ→1–2μ→0.6–0.8μ and Example 1→9→10, particle size 4–5μ→4–5μ→<0.6μ.

The modification of particle size in such a narrow range may at first appear unimportant and superfluous, but it is known from practical experience that such small modifications are often of decisive importance.

Such small shifts are likewise possible, of course, in other particles size ranges within the limits of 0.5 to 15μ, for example between 5 and 8μ.

Within the indicated range of 0.5 to 15μ other average particle sizes which are not mentioned in the examples can likewise be obtained when other buffer salts are employed or the aforesaid buffer salts are used in a different concentration.

The following Examples 11–13 illustrate that it is also possible to maintain constant all the conditions with the exception of the semi-ester concentration and to shift the medium particle size only by varying the semi-ester concentration. It is especially pointed out that only small variations of the particle size are intended by small modifications of the semi-ester concentration.

| Example No. | 11 | 12 | 13 |
|---|---|---|---|
| Hydroxethyl cellulose,[1] parts | ← | 2.4 | → |
| Na phenylphenolate, part | ← | 0.2 | → |
| K persulfate, part | ← | 0.24 | → |
| Water, parts | ← | 76 | → |
| NaH₂PO₄.2H₂O, part | ← | 0.3 | → |
| Na₂HPO₄.12H₂O, part | ← | 0.7 | → |
| Monoisooctyl maleate, part | 0.22 | 0.34 | 0.4 |
| Solid content, percent | | 56 | |
| Latex viscosity | 10–15 | 10–15 | 10–15 |
| K value [2] | | 50–55 | |
| Average particle size, μ | 0.5–2 | 1.0–3.5 | 1.5–4 |

[1] Viscosity of the 5% aqueous solution at 20° C. equals 300 centipoises, oxethyl content 28%.
[2] According to Fikentscher, Cellulose-chemie, 13, 58 (1932).

Examples 11–13 show that the substantially uniform particle size increases in the presence of increasing amounts of semi-ester.

The following examples illustrate that it is possible to deduce from the average particle sizes produced with definite, discrete buffer concentrations the average particle sizes which are obtained with the addition of varying amounts of the same buffer. The following table gives the average particle sizes produced in the polymerization of a standard batch with the use of varying amounts of $$NaHPO_4.12H_2O$$

(Examples 14–18) or borax (Examples 19–22). In the accompanying drawing the average particle sizes obtained are plotted on the ordinate and the amounts of basic buffer used are plotted on the abscissa. It is evident from the curves that a relationship exists between the average particle size and the amount of basic buffer. The substantially uniform particle size decreases in the presence of increasing amounts of basic buffer. It is not difficult to those skilled in the art to find the corresponding curve in an analogous case.

| Example No. | 14 | 15 | 16 | 17 | 18 | 19 | 20 | 21 | 22 |
|---|---|---|---|---|---|---|---|---|---|
| Vinly acetate, parts | ←  |  |  |  | 100 |  |  |  | → |
| Hydroxyethylcellulose, parts | ← |  |  |  | 2.4 |  |  |  | → |
| Na-phenylphenolate, part | ← |  |  |  | 0.2 |  |  |  | → |
| Potassium persulfate, part | ← |  |  |  | 0.33 |  |  |  | → |
| Water, parts | ← |  |  |  | 76 |  |  |  | → |
| Na₂HPO₄.12H₂O | | 0.1 | 0.4 | 1.0 | 2.0 | | | | |
| Borax | | | | | | | 0.1 | 1.0 | 2.0 |
| Solid content, percent | ← | | | | 56–58 | | | | → |
| Average particle size, μ | 4 | 2 | 1.3 | 1 | 0.9 | 4 | 1.5 | 0.8 | 0.7 |

In the process of the invention there can be used as monomers vinyl esters, such as vinyl acetate, vinyl propionate, vinyl butyrate, vinyl laurate, vinyl stearate, or mixtures of said vinyl esters with one another.

Isopropenyl acetate can be used, too, either alone or in admixture with vinyl esters.

Alternatively copolymers can be prepared from the vinyl esters with other unsaturated compounds, such as esters of unsaturated acids, for example acrylic acid, or α,β-dicarboxylic acids, for example maleic acid or fumaric acid. The alcohol component of said esters shall preferably contain 1–8 carbon atoms in a straight or branched chain, for example methanol, ethanol, propanol, the isomers of butanol, of hexanol, such as 2-ethyl-butanol, of octanol, such as 2-ethyl-hexanol, and the like.

The monomers are advantageously not stabilized. A stabilization can be brought about when this does not inhibit the polymerization, for example with 15 parts per million hydroquinone.

As protective colloids water-soluble cellulose derivatives are used, preferably oxethyl cellulose having an oxethyl content in the range from 10–40% and advantageously 25–35%.

This viscosity of the 5% aqueous solution of the hydroxyethyl cellulose at 20° C. varies between 50 and 2000 centipoises, and preferably is between 200 and 500 centipoises.

The concentration of the hydroxyethyl cellulose in the aqueous phase varies between about 0.5 and 15% by weight, preferably between 1 and 5% by weight. The latex viscosity of the dispersion is influenced by the hydroxyethyl cellulose and depends on the concentration of the latter in the aqueous phase, on the oxethyl content of the hydroxyethyl cellulose, and on the viscosity thereof, as determined in a 5% aqueous solution at 20° C.

A low hydroxyethyl content and a low viscosity result in low latex viscosities, and vice versa. It is thus possible to predetermine the latex viscosity of the dispersion by the selection of the corresponding hydroxyethyl cellulose and the concentration thereof.

The hydroxyethyl celluloses mentioned are commercially available.

As suitable buffers there can be mentioned by way of example primary and secondary water-soluble salts of orthophosphoric acid, either alone or preferably in admixture with one another, and water-soluble salts of boric acids or tetraboric acid. It is likewise possible to use water-soluble salts of organic acids, for example the salts of acetic acid, citric or adipic acid.

The buffers are only mentioned by way of example and are not intended to limit the invention thereto. It is obvious from the examples and the description that any buffer can be used.

The amounts of buffer used range from 0.025 to 5% by weight, and preferably from 0.5 to 1% by weight, calculated on the dispersion.

As semi-esters of unsaturated dicarboxylic acids there are mentioned by way of example the semi-esters of dicarboxylic acids having 4-10 carbon atoms, such as of maleic acid, fumaric acid, or itaconic acid.

Suitable alcohol components of the semi-esters are monohydric aromatic alcohols, such as benzyl alcohol, hydroaromatic alcohols, such as cyclohexanol and methylcyclohexanol, or monohydric, straight chain or branched, primary, secondary or tertiary aliphatic alcohols containing 1-30 carbon atoms, preferably 5-10 carbon atoms, such as pentanol, hexanol, or octanol.

It is also possible to use polyhydric alcohols. In the manufacture of semi-esters of polyhydric alcohols there are usually formed monomers containing two double bonds of the following formula

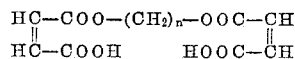

The mode of action of said semi-esters as an acid component corresponds to that of monomers containing one double bond. Such monomers containing two double bonds simultaneously bring about a cross-linking whereby the gel content of the polymer (cross-linked insoluble polymer) is increased. A high gel content may be of advantage when the dispersion is used for bonding purposes and in this case such semi-esters as contain two double bonds are preferred. The amount of said semi-esters containing two double bonds used varies between 0.01 and 3% and preferably 0.01 and 0.5% by weight, calculated on the dispersion.

The amounts of semi-esters containing one double bond ranges from 0.01 to 3% by weight, preferably 0.01 to 0.5% by weight, calculated on the dispersion. It is especially pointed out that the alcohol component of the semi-ester does not influence the particle size as appears to be comprehensible from the description. Consequently, the alcohol components mentioned are not critical.

It is also possible to use semi-esters of saturated acids such as succinic acid or phthalic acid in the invention. Since, however, such semi-esters are not capable of being polymerized, the formation of additionally stabilizing polymers by copolymerization is impossible, and the use of semi-esters of unsaturated dicarboxylic acids is preferred.

As alkali metal salts of monohydroxy-diphenyls there are suitable those of 2- or 3- or 4-hydroxydiphenyl, usually of 2-hydroxy-diphenyl, though the others are likewise suitable. The amount used is 0.025-5%, preferably 0.1-0.3% by weight, calculated on the dispersion.

Suitable polymerization catalysts are redox systems, for example the known system of $K_2S_2O_8$ and $NaHSO_3$ or other usual activators, such as $H_2O_2$, salts of peroxydisulfuric acid (for example the potassium, sodium or ammonium salt), or perborates.

The activator can be added at the beginning and/or in portions in the course of the polymerization. The amount of activator is, in general, 0.05-4% and preferably 0.05-0.5% by weight, calculated on the dispersion.

Depending on the manufacturing conditions, the dispersions produced by the process of the invention can have very different viscosities. It is of advantage to produce dispersions the viscosity of which ranges from 10 to 100 poises. Lower and higher latex viscosities can be obtained, too. This is possible by the selection of the hydroxyethyl celluloses. The solid content of the dispersion varies, in general, between 40 and 70% by weight, preferably between 50 and 60% by weight.

Further variations are possible in the process of the invention.

The polymerization temperature, usually about 70–90° C., can be lowered when suitable activators are used. On the other hand, it is also possible to polymerize at a temperature above 100° C., if desired, under superatmospheric pressure to avoid boiling of the reaction mixture and evaporation of the monomer. Instead of operating as described in the examples, part of the monomer, for example 5–10% of the total amount, can be emulsified into the aqueous phase at room temperature and the residual 95–90% can be added continuously at a temperature of 70–80° C. Also the polymerization can be started, without first charging the vessel with monomer, at 80° C. by continuously adding the monomer or monomers directly after the addition of the activator.

Alternatively, the reaction mixture can be circulated by means of pumps, the monomer condensing in the reflux condenser being mixed outside of the reaction vessel with the circulated reaction mixture. The description and the examples serve to illustrate the invention but they are not intended to limit it thereto.

We claim:

1. In a process for the manufacture of polyvinyl ester dispersions containing particles of a substantially uniform size, the improvement which comprises adjusting this substantially uniform size of said particles within a range of 0.5 micron to 15 microns by polymerizing vinyl esters in the presence of a protective colloid, of an hydrolyzable emulsifier, and of basic buffer salts and acidic semi-esters which affect the degree of hydrolysis of the hydrolyzable emulsifier, said substantially uniform particle size decreasing within the stated range in the presence of increasing amounts of basic buffer between 0.025 percent and 5 percent, and increasing within the stated range in the presence of increasing amounts of semi-ester between 0.01 percent and 3 percent, said protective colloid being hydroxyethyl cellulose present in an amount of 0.5 percent to 15 percent, said hydrolyzable emulsifier being an alkali metal salt of monohydroxy diphenyl present in an amount of 0.025 to 5 percent, said basic buffer being an alkali metal salt of a weak acid selected from the group consisting essentially of phosphoric, boric, acetic, citric, and adipic acids, and said semi-ester being a semi-ester of an unsaturated aliphatic dicarboxylic acid of 4–10 carbon atoms and an alcohol selected from the group consisting of benzyl alcohol, cyclohexanol, methylcyclohexanol, and aliphatic alcohols having 1–30 carbon atoms, all percentages being by weight of the dispersion.

2. A process as claimed in claim 1, wherein the semi-ester used is a semi-ester of an acid selected from the group consisting of maleic acid, fumaric acid, and itaconic acid.

3. A process as claimed in claim 1, wherein vinyl acetate is used for the manufacture of the polyvinyl ester dispersion.

4. A process as claimed in claim 1, wherein the semi-ester is present in an amount of 0.01 percent and 0.5 percent.

5. In the process for the manufacture of copolymer dispersions containing particles of a substantially uniform size, the improvements which comprises adjusting this substantially uniform size of said particles within a range of 0.5 micron to 15 microns by copolymerizing vinyl ester monomers and monomers of an ester of an unsaturated dicarboxylic acid with an alcohol having 1 to 8 carbon atoms in the presence of a protective colloid, of an hydrolyzable emulsifier, and of basic buffer salts and acidic semi-esters which affect the degree of hydrolysis of the hydrolyzable emulsifier, said substantially uniform particle size decreasing within the stated range in the presence of increasing amounts of basic buffer between 0.025 percent and 5 percent, and increasing within the stated range in the presence of increasing amounts of semi-ester between 0.01 percent and 3 percent, said protective colloid being hydroxyethyl cellulose present in an amount of 0.5 percent to 15 percent, said hydrolyzable emulsifier being an alkali metal salt of monohydroxy diphenyl present in an amount of 0.025 to 5 percent, said basic buffer being an alkali metal salt of a weak acid selected from the group consisting essentially of phosphoric, boric, acetic, citric, and adipic acids, and said semi-ester being a semi-ester of an unsaturated aliphatic dicarboxylic acid having 4–10 carbon atoms and an alcohol selected from the group consisting of benzyl alcohol, cyclohexanol, methylcyclohexanol, and aliphatic alcohols having 1–30 carbon atoms, all percentages being by weight of the dispersion.

6. In a process for the manufacture of polyvinyl ester dispersions containing particles of a substantially uniform size, the improvement which comprises adjusting this substantially uniform size of said particles within a range of 0.5 micron to 15 microns by polymerizing vinyl esters in the presence of a protective colloid, of an hydrolyzable emulsifier, and of basic buffer salts which affect the degree of hydrolysis of the hydrolyzable emulsifier, said substantially uniform particle size decreasing within the stated range in the presence of increasing amounts of basic buffer between 0.025 percent and 5 percent, said protective colloid being hydroxyethyl cellulose present in an amount of 0.5 percent to 15 percent, said hydrolyzable emulsifier being an alkali metal salt of monohydroxy diphenyl present in an amount of 0.025 to 5 percent, said basic buffer being an alkali metal salt of a weak acid selected from the group consisting essentially of phosphoric, boric, acetic, citric, and adipic acids, all percentages being by weight of the dispersion.

7. In a process for the manufacture of polyvinyl ester dispersions containing particles of a substantially uniform size, the improvement which comprises adjusting this substantially uniform size of said particles within a range of 0.5 micron to 15 microns by polymerizing vinyl esters in the presence of a protective colloid, of an hydrolyzable emulsifier, and acidic semi-esters which affect the degree of hydrolysis of the hydrolyzable emulsifier, said substantially uniform particle size increasing within the stated range in the presence of increasing amounts of semi-ester between 0.01 percent and 3 percent, said protective colloid being hydroxyethyl cellulose present in an amount of 0.5 percent to 15 percent, said hydrolyzable emulsifier being an alkali metal salt of monohydroxyl diphenyl present in an amount of 0.025 to 5 percent, and said semi-ester being a semi-ester of an unsaturated aliphatic dicarboxylic acid having 4–10 carbon atoms and an alcohol selected from the group consisting of benzyl alcohol, cyclohexanol, methylcyclohexanol, and aliphatic alcohols having 1–30 carbon atoms, all percentages being by weight of the dispersion.

8. A polyvinyl ester dispersion produced according to the process of claim 1, said dispersion comprising essentially uniform particles of polyvinyl ester having an adjusted size within the range of 0.5 micron to 15 microns.

9. A copolymer dispersion produced according to the process of claim 5, said dispersion comprising essentially uniform particles of copolymers having an adjusted size within the range of 0.5 micron to 15 microns.

References Cited in the file of this patent

FOREIGN PATENTS 658,426    Great Britain _____ Oct. 10, 1951